(12) United States Patent
Altenhoven et al.

(10) Patent No.: US 11,621,125 B2
(45) Date of Patent: Apr. 4, 2023

(54) VARIABLE VACUUM CAPACITOR AND COOLING METHOD

(71) Applicant: COMET AG, Flamatt (CH)

(72) Inventors: Thierry Altenhoven, Zollikofen (CH); Walter Bigler, Heitenried (CH); Timothy Albert Weber, Bern (CH); Mark Mildner, Gurbrü (CH)

(73) Assignee: COMET AG, Flamatt (CH)

( * ) Notice: Subject to any disclaimer, the term of this patent is extended or adjusted under 35 U.S.C. 154(b) by 302 days.

(21) Appl. No.: 16/605,288

(22) PCT Filed: Apr. 13, 2018

(86) PCT No.: PCT/EP2018/059608
§ 371 (c)(1),
(2) Date: Oct. 15, 2019

(87) PCT Pub. No.: WO2018/189402
PCT Pub. Date: Oct. 18, 2018

(65) Prior Publication Data
US 2020/0058441 A1 Feb. 20, 2020

(30) Foreign Application Priority Data
Apr. 13, 2017 (EP) .................................. 17166679

(51) Int. Cl.
*H01G 2/08* (2006.01)
*H01G 5/14* (2006.01)
(Continued)

(52) U.S. Cl.
CPC .............. *H01G 2/08* (2013.01); *H01G 5/013* (2013.01); *H01G 5/017* (2013.01); *H01G 5/14* (2013.01); *H01G 2005/02* (2013.01)

(58) Field of Classification Search
CPC ............ H01G 5/013; H01G 5/14; H01G 2/08; H01G 5/017
See application file for complete search history.

(56) References Cited

U.S. PATENT DOCUMENTS 2,186,842 A * 1/1940 Scoville ................. H01G 4/224
361/274.2
2,740,920 A * 4/1956 Jennings ................. H01J 19/36
315/58
(Continued)

FOREIGN PATENT DOCUMENTS

CH         656740 A5 *  7/1986  ............... H01G 5/01
CH         698131 B1 *  5/2009  ............. H01G 5/017
(Continued)

*Primary Examiner* — David M Sinclair
(74) *Attorney, Agent, or Firm* — The Webb Law Firm

(57) ABSTRACT

A variable vacuum capacitor is described in which oil inside the main bellows (21) is pumped through the bellows and through the oil circuit (8) of a heat exchanger by a pump (15). Water passes through coolant channels (6) of the heat exchanger, from inlet (7) to outlet (7'). The extendable capacitor drive shaft (14) is hollow and serves as a conduit, conveying the oil to the bottom of the (bellows 21), thereby ensuring a full circulation of the oil right through the bellows and then through the heat exchanger. Pump drive means (9) may be a gerotor hydraulic motor, coupled to a gerotor oil pump (15) via magnetic coupling (22). Pumping heat transfer fluid (oil) through the bellows allows the capacitor to operate at significantly higher currents and/or lower temperatures, and significantly extends the life of the device.

12 Claims, 5 Drawing Sheets

(51) Int. Cl.
   *H01G 5/017*   (2006.01)
   *H01G 5/013*   (2006.01)
   *H01G 5/00*   (2006.01)

(56) References Cited

U.S. PATENT DOCUMENTS

| | | | | |
|---|---|---|---|---|
| 3,098,956 | A * | 7/1963 | Hammer, Jr. | H01G 4/228 |
| | | | | 361/274.3 |
| 3,270,259 | A * | 8/1966 | Oeschger | H01G 5/01 |
| | | | | 361/279 |
| 3,571,677 | A * | 3/1971 | Oeschger | H01G 2/08 |
| | | | | 361/279 |
| 3,758,699 | A * | 9/1973 | Lusk | H02G 15/22 |
| | | | | 174/15.3 |
| 4,428,025 | A * | 1/1984 | King | H01G 5/01 |
| | | | | 138/122 |
| 4,488,592 | A | 12/1984 | Mittal et al. | |
| 4,639,202 | A * | 1/1987 | Mahanay | F01C 20/22 |
| | | | | 417/406 |
| 7,313,926 | B2 | 1/2008 | Gurin | |
| 7,573,762 | B2 | 8/2009 | Kenkare et al. | |
| 8,139,359 | B2 | 3/2012 | Jaggi et al. | |
| 9,721,729 | B2 | 8/2017 | Mildner et al. | |
| 9,911,532 | B2 * | 3/2018 | Gupta | H01G 4/38 |
| 2007/0199337 | A1 | 8/2007 | Otake et al. | |
| 2012/0020820 | A1 | 1/2012 | Francini | |
| 2018/0128268 | A1 * | 5/2018 | Bornemann | F04C 15/008 |

FOREIGN PATENT DOCUMENTS

| | | | | |
|---|---|---|---|---|
| CN | 101802945 | A | 8/2010 | |
| CN | 102365460 | A | 2/2012 | |
| CN | 103578745 | A | 2/2014 | |
| CN | 204206711 | U | 3/2015 | |
| CN | 105531777 | A | 4/2016 | |
| CN | 205230821 | U | 5/2016 | |
| CN | 205933772 | U | 2/2017 | |
| JP | 2007232225 | A | 9/2007 | |
| JP | 2009523992 | A | 6/2009 | |
| JP | 2010529677 | A | 8/2010 | |
| WO | WO-2009033501 | A1 * | 3/2009 | H01G 5/017 |
| WO | WO-2012174651 | A1 * | 12/2012 | F01C 1/103 |
| WO | WO-2016174164 | A1 * | 11/2016 | F04C 2/102 |

* cited by examiner

VARIABLE VACUUM CAPACITOR AND COOLING METHOD

FIELD OF THE INVENTION

The invention relates to the field of variable vacuum capacitors suitable for use in radio-frequency (RF) power applications such as, for example, dynamic impedance matching of RF power supplied to plasma generators. The invention relates in particular to arrangements for cooling such capacitors.

BACKGROUND OF THE INVENTION

Variable vacuum capacitors commonly comprise sets of parallel electrodes which are made to overlap to a greater or lesser degree, typically by mechanically moving them relative to each other. A common configuration is for one of the electrodes to be fixed, while the other is moved axially in and out. Metal bellows are typically used to provide a current path to the mobile electrode, while allowing the mobile electrode to move through the desired displacement range. This kind of variable vacuum capacitor may be used in circuits for driving plasma chambers, for example those used in industrial processes such as surface treatment of materials or plasma etching in semiconductor fabrication processes. The larger the area to be treated or etched, the more power is required. There is a need for a variable vacuum capacitor which can be operated at significantly higher power, and/or with a significantly longer operating life than those currently available.

PRIOR ART

Variable vacuum capacitors have been developed which are capable of handling high power and operating reliably over tens or hundreds of thousands of duty cycles, where one duty cycle is defined as the movement of the movable electrode from any one position to any other position and back. An example of a high-power variable vacuum capacitor is shown in FIG. 1, which is similar to the variable capacitor described in PCT application WO2009033501A1. The capacitor of FIG. 1 has two sets of overlapping electrodes 2, 3 which are arranged in a vacuum chamber 4. The vacuum chamber is formed by the outer walls of the device and by the bellows 21. The electrode overlap area is varied in this example by rotating an axially fixed part 12, 13 of the drive shaft, which is in threaded engagement with an axially mobile but rotationally fixed part 14 of the drive shaft. The shaft is typically rotated by an electric motor (for example a stepper motor) and a mechanical drive mechanism. The bellows 21 fulfills multiple functions: it carries electrical current to the mobile electrode 2; it provides an impermeable barrier to maintain the vacuum in the vacuum chamber; it allows the electrode 2 to move downwards when the shaft 14 is extended; and it provides a spring force urging the electrode 2 to move upwards when the shaft 14 is retracted. The interior of the bellows is filled with a heat transfer liquid such as oil. Because the internal volume of the bellows changes as the mobile electrode 2 is moved up and down, a compensation volume 10 is provided which can accommodate excess oil when the shaft 14 is retracted. This oil returns to the main bellows 21 when the shaft 14 is extended again. The compensation volume 10 is at substantially atmospheric pressure, both inside and out, and can therefore be constructed as a simple rubber bellows 11. Water cooling is provided by passing water through pipes 5 near to the base of the compensation volume 10, and heat is drawn from the bellows 21 using heat pipes 5 to transfer heat from the oil in the main bellows 21 to the vicinity of the water circuit 6. By cooling the oil inside the bellows 21, the operating power of the device can be extended. However, the demands of modern plasma processes are increasing significantly, and there is a need for a variable vacuum capacitor which can operate at much greater power without compromising its longevity. Whereas the capacitor of WO2009033501A1 can be operated at 450A RF current, for example, there is a need for a capacitor which can be operated at significantly higher currents or power (e.g. 650A RF current) without incurring a penalty of a shortened device life.

It is known from Chinese utility model CN205230821U to use a pump to circulate coolant through a cooling circuit of a capacitor. However, the cooling circuit described in this document would not be suitable for use in a vacuum capacitor. A vacuum capacitor operates at a high vacuum (eg $10^{-7}$ Torr or better), and CN205230821U offers no suggestion how its cooling circuit could be adapted for use in such an environment.

Furthermore, CN205230821U describes a cooling circuit for a fixed capacitor, and offers no suggestion to adapt the cooling circuit for cooling the moving bellows of a variable vacuum capacitor.

BRIEF DESCRIPTION OF THE INVENTION

The present invention aims to overcome at least some of the above disadvantages of prior art variable vacuum capacitors. To this end, a variable vacuum capacitor according to the invention is described in the attached claim 1, and a method according to the invention is described in claim 13. Further variants of the invention are described in the dependent claims.

By pumping the heat transfer liquid (eg oil) through the bellows and to a heat exchanger, the capacitor can be operated with the bellows at a much lower temperature and/or carrying a much greater current, thereby significantly extending the maximum power of the device and/or the life of the device. An additional advantage of cooling by pumping oil through the bellows is that the pumped cooling of the bellows operates over a wider temperature range than was possible in prior art capacitors, where the heat-transfer using heat pipes was effective over a narrow temperature range defined by the design of the heat pipes. The active (pumped) cooling of the invention also permits varying the cooling rate (eg by varying the flow rate of the heat transfer fluid), for example in dependence on the bellows temperature or the bellows current, which may vary widely during operation. The cooling arrangements of prior art capacitors were not controllable in this way.

The invention will be described in detail with reference to the attached drawings, in which.

Figure 5:
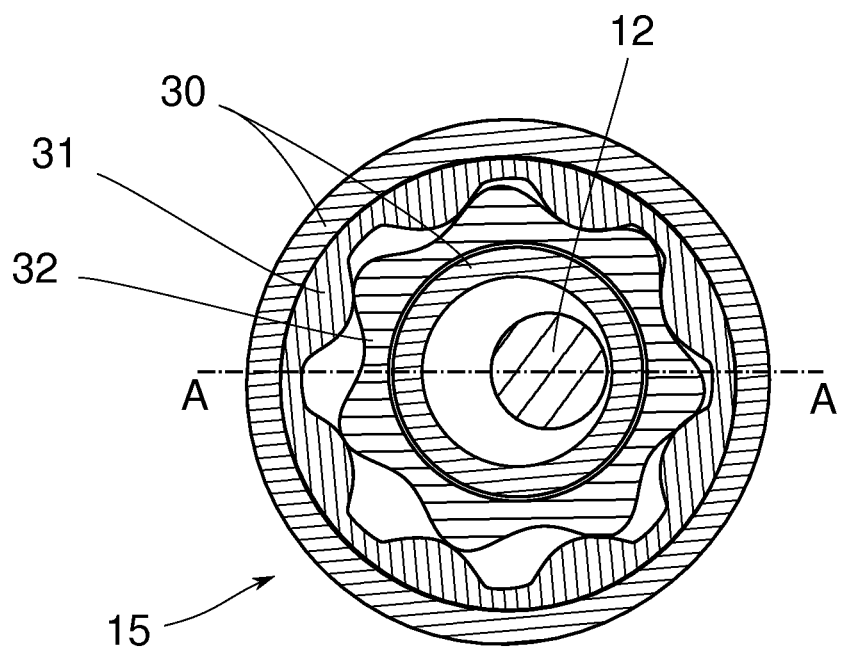
Figure 6:
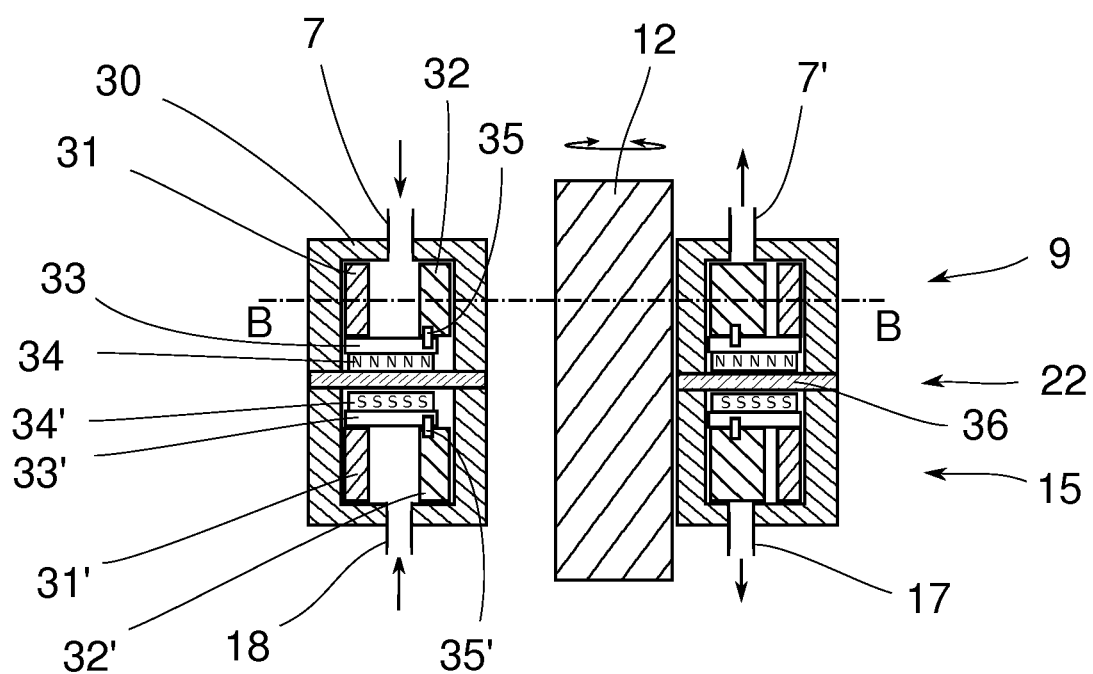

FIGS. 5 and 6 show schematic cross-sectional views of an example drive-pump arrangement which can be used to implement the third embodiment of the invention. FIG. 6 shows a vertical cross-section through axis A-A of FIG. 5. FIG. 5 shows a schematic plan cross-section through the axis B-B of FIG. 6.

It should be noted that the figures are provided merely as an aid to understanding the principles underlying the invention, and should not be taken as limiting the scope of protection sought. Where the same reference numbers are used in different figures, these are intended to indicate similar or equivalent features. It should not be assumed, however, that the use of different reference numbers is intended to indicate any particular difference between the features to which they refer.

DETAILED DESCRIPTION OF THE INVENTION

Figure 1:
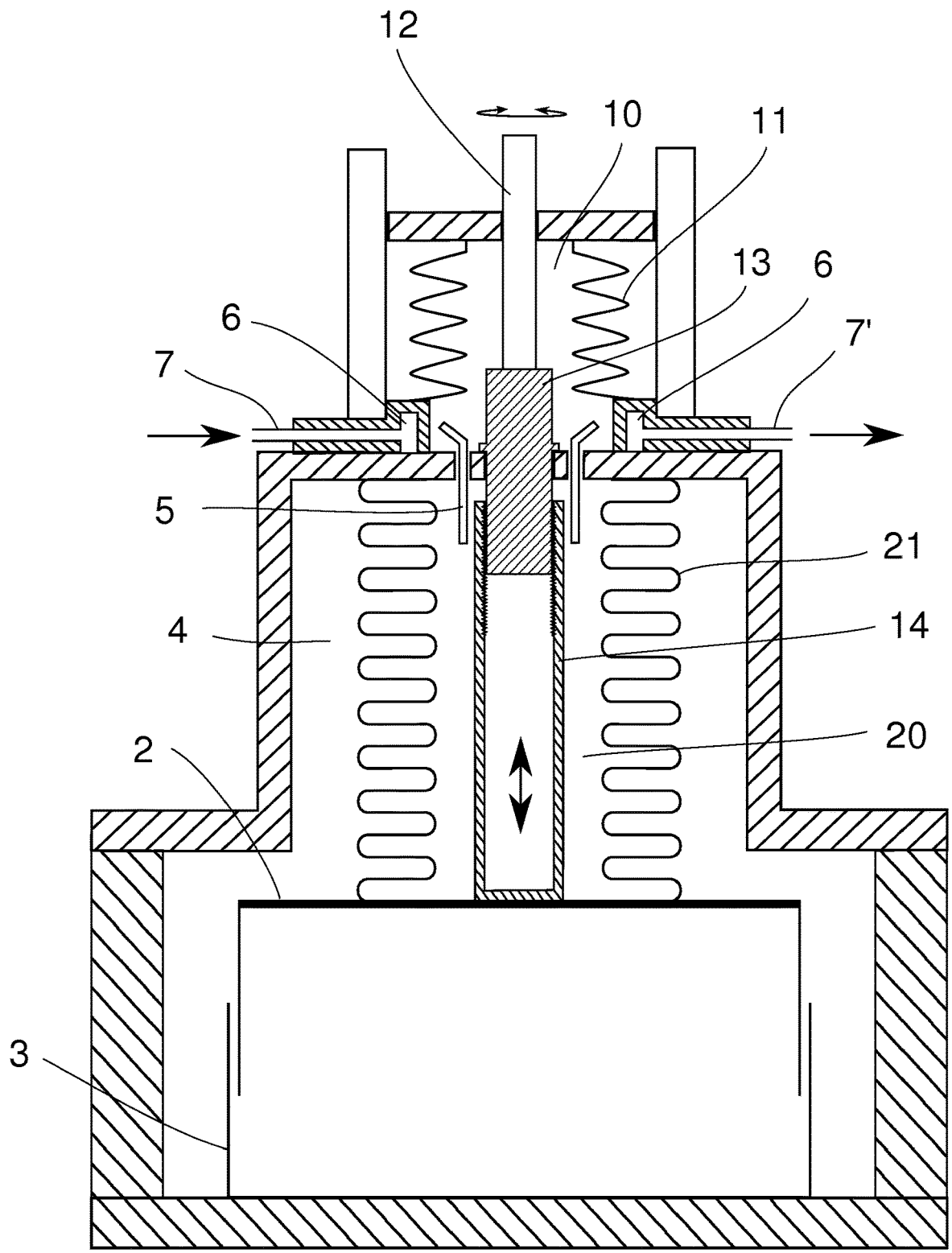
FIG. 1 shows a schematic view of a variable vacuum capacitor of the prior art, as described above.
Figure 2:
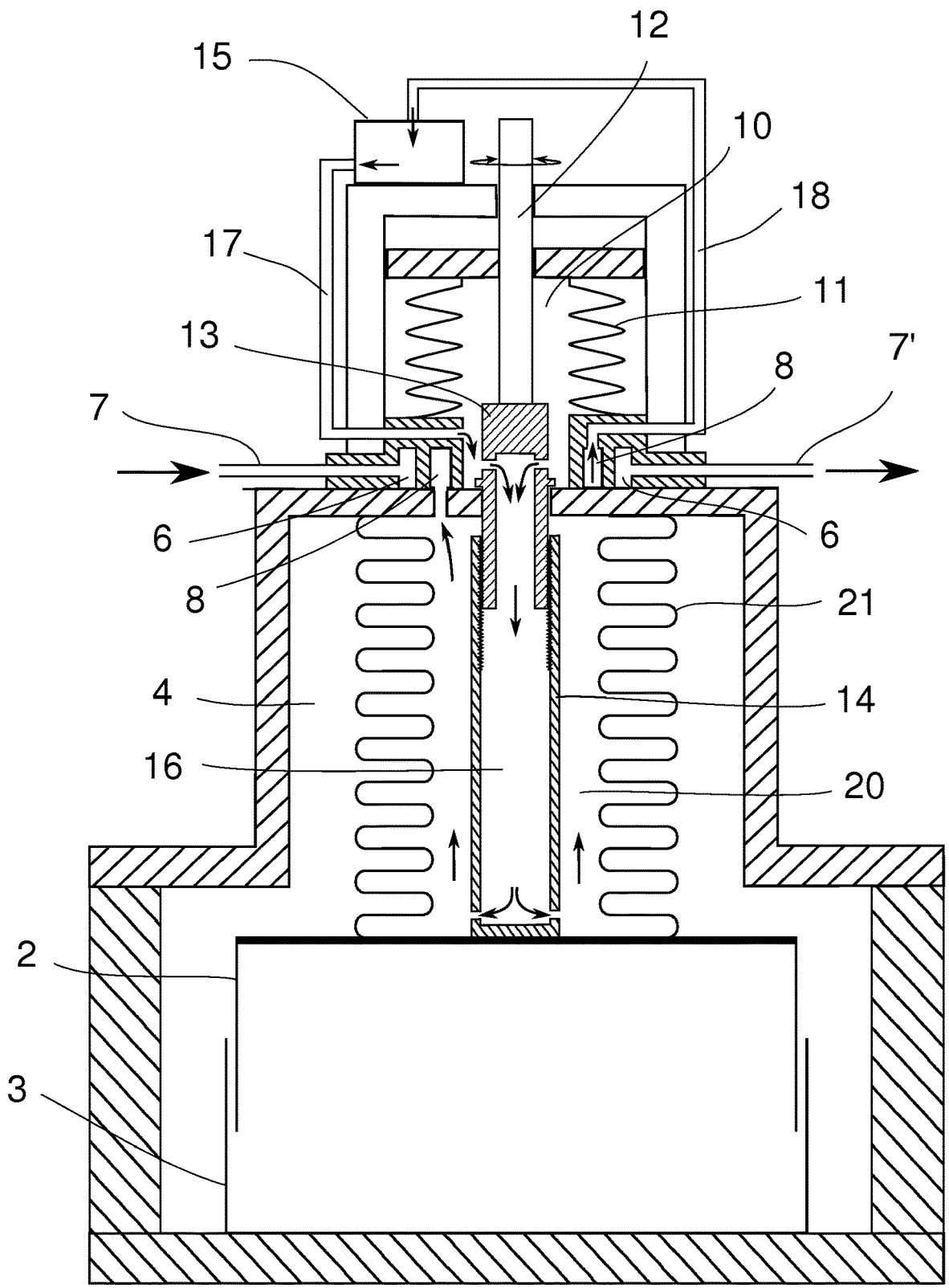
FIG. 2 shows a schematic view of an example of a variable vacuum capacitor according to a first embodiment of the invention.

FIG. 2 shows a highly simplified schematic cross-section view of a variable vacuum capacitor according to a first embodiment of the invention. A heat transfer fluid such as an oil, fills the main bellows 21 and the expansion bellows 11, as in the prior art capacitor shown in FIG. 1. Coolant, such as water, is passed through a coolant circuit from coolant inlet 7, through one or more coolant heat exchange channels, e.g., water circuit 6, to coolant outlet 7'. A heat transfer fluid circuit is provided for circulating the heat transfer fluid (e.g. oil) through heat exchange channels 8 of the heat exchanger, such that heat is transferred from the oil to the water.

The oil is circulated through the heat transfer fluid circuit by means of a pump 15 or similar fluid propulsion means. From the pump 15, the oil circulates through feed conduit 17 and passes through one or more openings in the proximal region of the capacitor drive shaft 13, 14—preferably in the axially static part 13 of the shaft which engages with the axially-mobile part 14. The shaft comprises a longitudinal fluid conduit 16 extending from the proximal region to the distal region of the shaft, where the oil passes out through one or more distal openings from the conduit into the interior volume of the bellows 21. The space 20 between the outer surface of the shaft and the inner surface of the bellows 21 acts as another conduit for carrying the oil from the distal end of the shaft up to the top of the bellows 21, such that the oil circulates under pumped propulsion along the inner surface of the bellows 21. One or more fluid passages are provided at the top of the bellows 21 to allow the heat transfer fluid to pass from the interior volume 20 of the bellows 21 into the heat exchange channels 8 of the heat exchanger. From the heat exchanger, the oil flows through return conduit 18, back to an inlet of the pump 15.

As illustrated, the heat transfer fluid preferably flows from the bellows 21 directly to the heat exchanger, so that the temperature differential between the coolant channels and the heat transfer fluid channels 8 is maximised. However, the pumped cooling arrangement could still be effective and may even be advantageous if the flow direction were reversed (see discussion of pressure drop, below).

Figure 3:
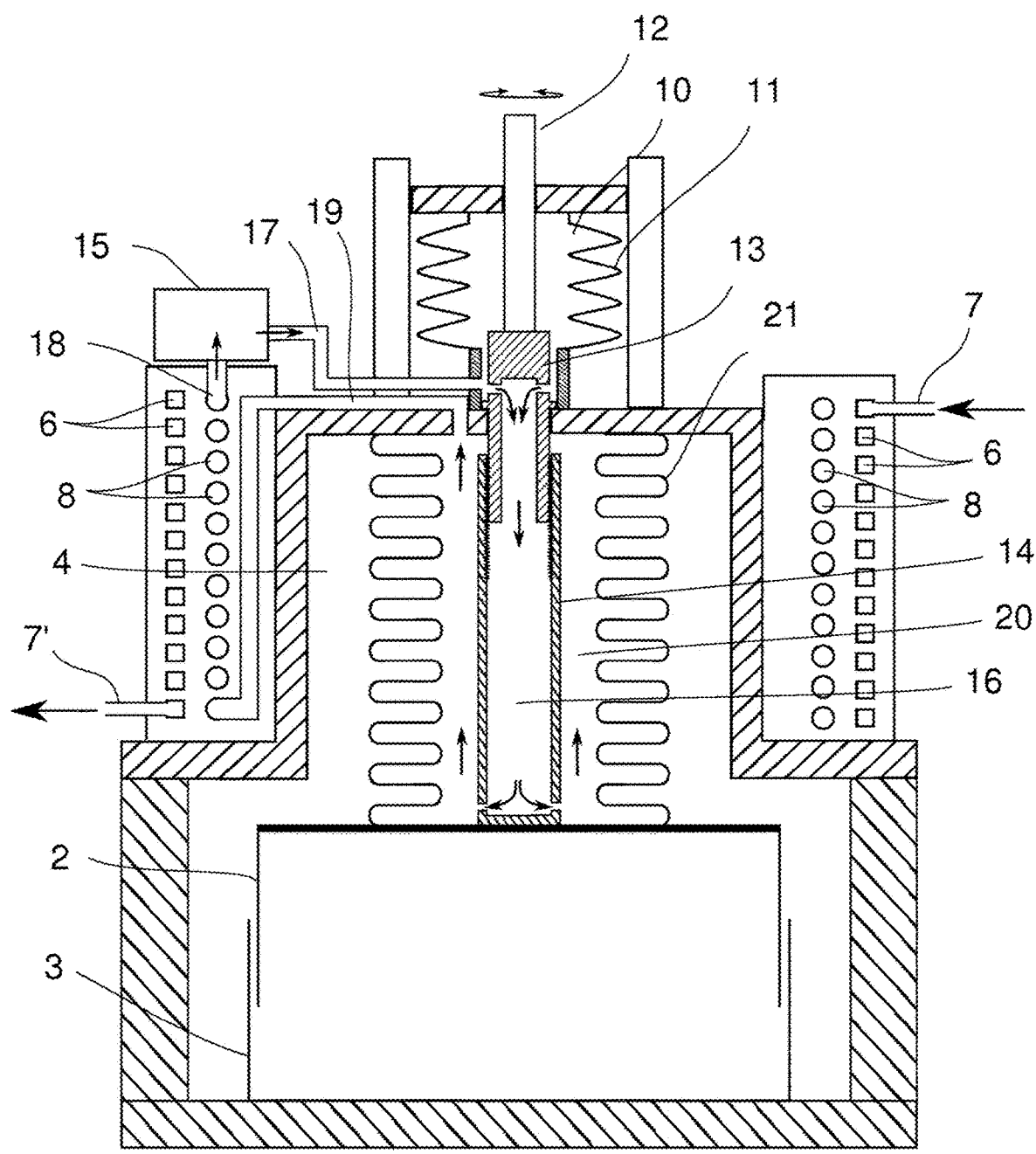
FIG. 3 shows a schematic view of an example of a variable vacuum capacitor according to a second embodiment of the invention.

FIG. 3 shows a second embodiment of the invention, in which the heat transfer fluid which is heated while being circulated through the bellows is pumped through a more extensive heat exchange matrix. The coolant (eg water) channels of the matrix are illustrated as square section channels 6, and the heat transfer fluid channels are illustrated as round section channels 8. These shapes are chosen purely for illustration purposes, to help distinguish between the two separate heat exchange circuits; such a difference would normally not be present in a real implementation. The extensive heat exchange matrix illustrated in FIG. 3 is bulkier than the simple heat exchanger arrangement illustrated in FIG. 2, and can advantageously be formed as a jacket around the outer surface of the capacitor's vacuum chamber, as shown. This allows a much greater cooling capacity, and therefore a much higher operating power of the capacitor, but without increasing the capacitor's physical footprint. This allows the inventive capacitor to replace existing capacitors without the need to re-arrange adjacent circuit elements. Since vacuum capacitors are typically used at very high voltages, where inter-component distances are critical, re-arranging components is a non-trivial task.

The heat exchanger is arranged to maximise the surface area of oil in contact with the body through which the channels 8 are formed, while minimising the pressure drop due to the flow resistance of the heat exchange channels 8. A large pressure drop can raise the pressure of the oil in the bellows above atmospheric pressure, and thereby increase the pressure differential on the material of the bellows (e.g. stainless steel, bronze) above 1 bar. The operational life of the bellows is strongly affected by the pressure differential under which is operates. A bellows which has a duty cycle of a million movements under zero pressure differential may have a duty cycle of about 20,000 under a pressure differential of 3 bar, for example. A small reduction in the pressure differential can greatly extend the operational life of the bellows. The oil is circulated through the heat transfer fluid circuit and out of the heat exchanger by means of pump 15 or similar fluid propulsion means. From the pump 15, the oil circulates through feed conduit 17 and passes through one or more openings in the proximal region of the capacitor drive shaft 13, 14.

The pressure drop due to the heat exchanger resistance is preferably less than 0.5 bar, and more preferably less than 0.3 bar, and still more preferably less than 0.15 bar. The surface area of the heat-exchange channels 8 is preferably at least 100 cm$^2$, and more preferably at least 500 cm$^2$, and still more preferably at least 1000 cm$^2$.

The effect of the pressure drop can advantageously be reduced by reversing the direction of oil flow, so that the oil heated in the bellows 21 passes first to the pump 15 and thence to the heat exchanger, so that the fluid in the bellows is on the lower-pressure side of the heat exchanger.

Figure 4:
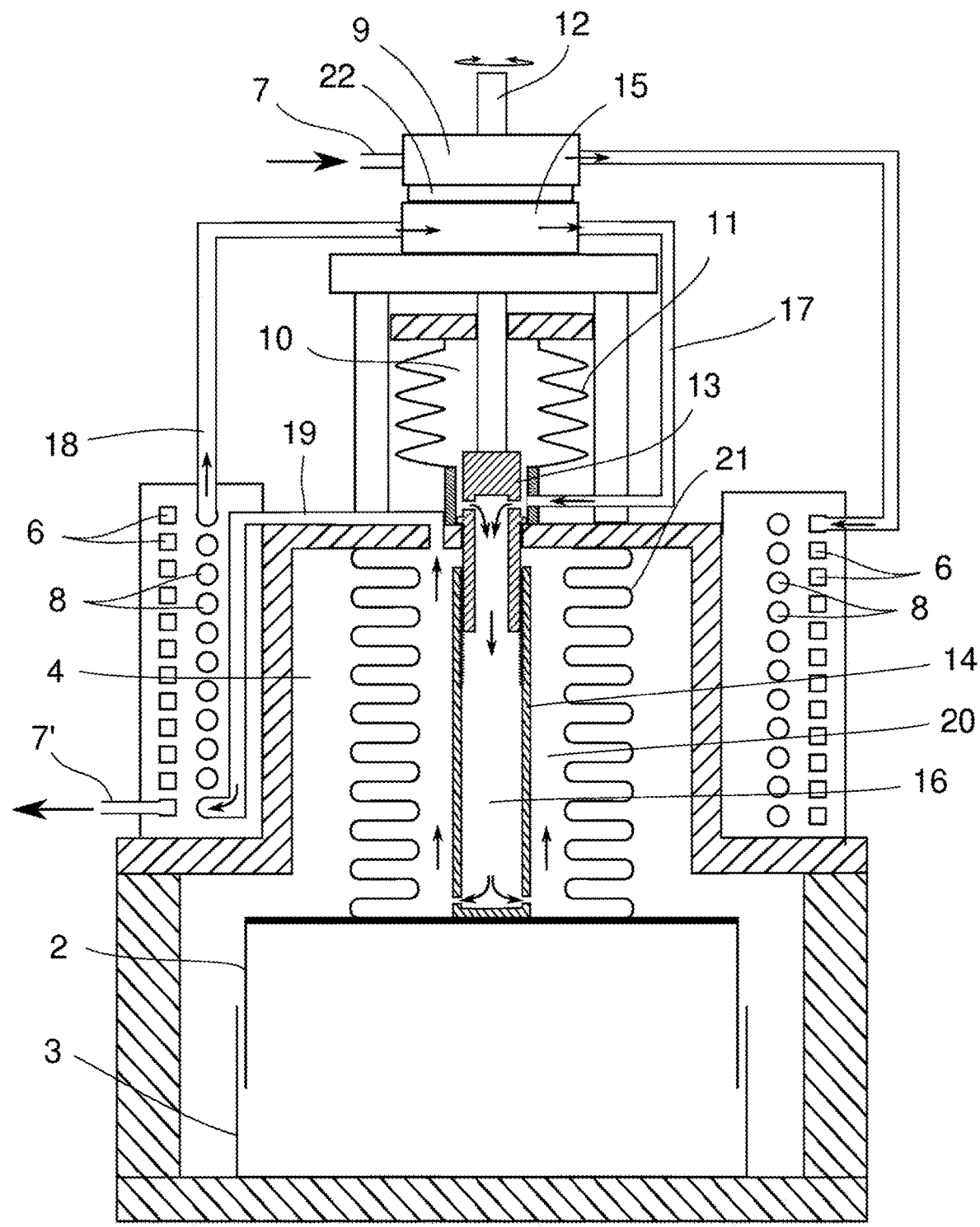
FIG. 4 shows a schematic view of an example of a variable vacuum capacitor according to a third embodiment of the invention.

FIG. 4 shows a third embodiment of the invention, which is similar to the second embodiment except in that, whereas the pump or propulsion means 15 of FIG. 3 may be a generic fluid propulsion device such as an electric impeller pump, the pump of FIG. 4 is powered by the flow of the coolant. Considering the liquid-driven pump arrangement more generally, energy from the flow of a first fluid/liquid (eg water in the case of the example vacuum capacitor) is used to pump a second fluid/liquid (heat transfer oil in the case of the example vacuum capacitor). Such a two-liquid drive/pump arrangement, in which the flow of a first liquid is used to pump a second liquid, also has applications in fields other than vacuum capacitor cooling.

A drive unit 9 is connected in the coolant inlet line at 7 (or could be connected in the outlet line at 7') and drives a mechanical pump 15 via drive coupling means 22. This arrangement has the advantage that no other supply connections are required for the cooling, apart from the coolant lines, and it enables a reliable and low-maintenance operation of the capacitor cooling. It is generally advantageous to avoid additional electrical connections to the capacitor, such as an electrical power supply to the oil pump, in a circuit environment where very high voltages are present. The water-powered operation has the additional advantage that the water flow through the drive 9 provides cooling for the drive and, indirectly, the pump 15.

As shown in FIG. 4, the pump drive means 9, the drive coupling means 22 and/or the pump 15 may be arranged coaxially with the drive shaft of the capacitor. Although there is no functional interaction between the drive shaft 12 and the pump/drive components 9, 22, 15, this arrangement allows the latter to be positioned so as to make the overall size and shape of the capacitor neat and compact.

The pump 15 may advantageously be implemented as positive displacement pump such as a gerotor. Gerotors are known in the prior art, and are used for example in oil pumps for vehicle engines. In the application to cooling a variable vacuum capacitor, the gerotor permits an even oil circulation without significant pressure fluctuations or shocks which may stress the bellows 21 and thereby shorten the operational life of the capacitor. The gerotor, having a central void, is also a convenient shape for mounting coaxially around the drive shaft of the capacitor as shown in FIG. 4.

Similarly, the pump drive means 9 may be implemented as a gerotor hydraulic motor, with similar advantages to those described above for the pump. Simple and reliable in operation, the gerotor drive 9 can convert the through flow of water into rotational energy for powering the pump 15.

The gerotor drive 9 is rotationally connected to the gerotor pump 15 by a coupling 22 which may be a conventional mechanical drive coupling, or may advantageously comprise a magnetic rotational coupling. In such a coupling, a first ring bearing magnets is rotated by the gerotor drive 9, thereby urging a second ring bearing magnets to rotate, which turns the rotor of the pump gerotor. The magnetic coupling reduces or eliminates the use of rotational seals, which can be a limiting factor on the operational life of the pump and drive.

An example of a drive-pump assembly in which both the drive 9 and the pump 15 are implemented as gerotors is illustrated in FIGS. 5 and 6. FIG. 6 shows a vertical cross-section through axis A-A of FIG. 5. FIG. 5 shows a schematic plan cross-section through the axis B-B of FIG. 6. The drive 9 is implemented as a first gerotor comprising outer rotor ring 31 and inner rotor ring 32 arranged in a housing 30. The pump 15 is implemented as a second gerotor comprising outer rotor ring 31' and inner rotor ring 32', also arranged in the housing 30. Coupling 22 is implemented as cooperating magnet rings 33 and 33'. The drive rotor chamber is separated from the pump rotor chamber by a sealing wall 36, which is configured to prevent fluid from the drive rotor chamber from entering the pump rotor chamber and vice versa. The drive shaft 12 of the variable vacuum capacitor extends through the inner void in the housing 30. Magnet rings 33, 33' are provided with mutually attracting magnets 34, 34', arranged on opposite sides of the sealing wall 36 and magnetically coupled so that rotating one of the magnet rings will cause the other to rotate. In the illustrated example, the magnet rings are rotationally secured to the inner rotors 32 and 32' respectively, as indicated by pins 35, 35'. Alternatively, the magnet rings 33, 33' could be rotationally secured to the outer gerotor rings 31, 31'.

Coolant is introduced into the gerotor 9 via an inlet 7, and exits via an outlet 7'. The side seals of the gerotor are provided by the inner surface of the upper housing wall 30 mating with the upper surface of the rotor rings 31, 32, and between lower surfaces of the rotor rings 31, 32 mating with the upper surface of the magnet-ring 33. Alternatively, or additionally, separate sealing elements can be used at these interfaces.

The fluid-driven pump technologies described here for pumping a heat transfer fluid through a vacuum capacitor may be used in any application in which the flow of a first fluid or liquid is available for providing the energy for pumping of a second fluid or liquid. The driving fluid and the driven fluid may be the same, or different. Waste water flow, or salt water flow may be used for pumping a different fluid (eg clean water), for example, or the various pumps of a vehicle (eg engine coolant, hydraulics, steering etc., may be driven by a liquid-powered pump driven by oil flow from an oil pump, for example. A single drive 9 may be used to drive multiple pumps 15, which may be arranged to pump multiple fluids, for example with different gerotor geometries for pumping at different flow rates and pressures. The pump may advantageously be configured, as in the example of FIGS. 4 to 6, such that the driving fluid and the driven fluids are kept separate, and do not come into contact with each other. The two may be at different pressures, temperatures, or have different chemical compositions, concentrations, flow rates or viscosities.

The cooling arrangement described above may comprise control means for varying the flow rate of the heat-transfer fluid, for example in dependence on the output of a sensor means. The sensor may be a temperature sensor or an electrical current sensor, for example. In the variable vacuum capacitor, the rate of cooling of the bellows may be varied in dependence on the current flowing in the bellows, or the temperature of the oil in the bellows, or some other parameter. The flow rate of the driven liquid may be varied by varying the flow rate of the driving liquid, or by varying the geometry of one of the gerotors 9, 15, or by means of a geared or otherwise variable coupling 22.

We claim:

1. A variable vacuum capacitor comprising:
   bellows for supplying electrical current to a movable electrode of the capacitor, the bellows surrounding a volume of heat transfer fluid,
   a heat exchanger comprising a heat exchange conduit for coolant to flow through so as to cool the heat transfer fluid; and
   a pump arranged to propel the heat transfer fluid through the bellows, into, and then through, the heat exchanger, the pump being arranged to propel the heat transfer fluid between the bellows and the heat exchanger, wherein the pump comprises a pump drive means for driving the pump, and wherein the pump drive means is arranged to be powered by coolant flow to and from the heat exchanger.

2. The capacitor according to claim 1, comprising a circuit for circulating the heat transfer fluid through the bellows and the heat exchanger.

3. The capacitor according to claim 1, comprising a shaft for extending or retracting the bellows, the shaft extending through the said volume, wherein the shaft comprises an inner conduit which forms part of a circuit, and wherein the inner conduit provides first fluid communication path for the heat transfer fluid in a first direction between a proximal region of the volume and a distal region of the volume.

4. The capacitor according to claim 3, wherein an outer part of the volume between an outer surface of the shaft and an inner surface of the bellows forms second fluid communication path for the heat transfer fluid in a second direction, opposite to the first direction, between the proximal and distal regions of the volume.

5. The capacitor according to claim 4, wherein the shaft is provided with openings at proximal and/or distal regions of the shaft for fluid communication between the inner conduit and the outer part.

6. The capacitor according to claim 1, wherein the pump and the pump drive means are arranged coaxially with a shaft such that the shaft extends through the pump and the pump drive means.

7. The capacitor according to claim 6, wherein the pump drive means and/or the pump comprises a gerotor.

8. The capacitor according to claim 7, wherein the pump drive means and the pump each comprise a gerotor, and wherein a rotor of the pump drive means is rotationally coupled to the rotor of the pump by magnetic coupling means.

9. The capacitor according to claim 1, wherein the heat exchanger comprises a heat transfer body comprising one or more first channels for the heat transfer fluid and one or more second channels for the coolant.

10. The capacitor according to claim 9, wherein the heat transfer body is formed around an outer surface of a vacuum chamber of the capacitor.

11. The capacitor according to claim 1, wherein a circuit comprises a fluid connection to a compensation volume of the capacitor.

12. A method of cooling bellows of a variable vacuum capacitor, characterized by:
   pumping a heat transfer fluid through the bellows,
   pumping the heat transfer fluid between the bellows and a heat exchanger;
   pumping coolant into the heat exchanger so as to cool the heat transfer fluid as it flows through the heat exchanger; and
   propelling the heat transfer fluid through the bellows and then through the heat exchanger; wherein coolant flow to and from the heat exchanger is configured to power the propulsion of the heat transfer fluid.

\* \* \* \* \*